Figure 1:
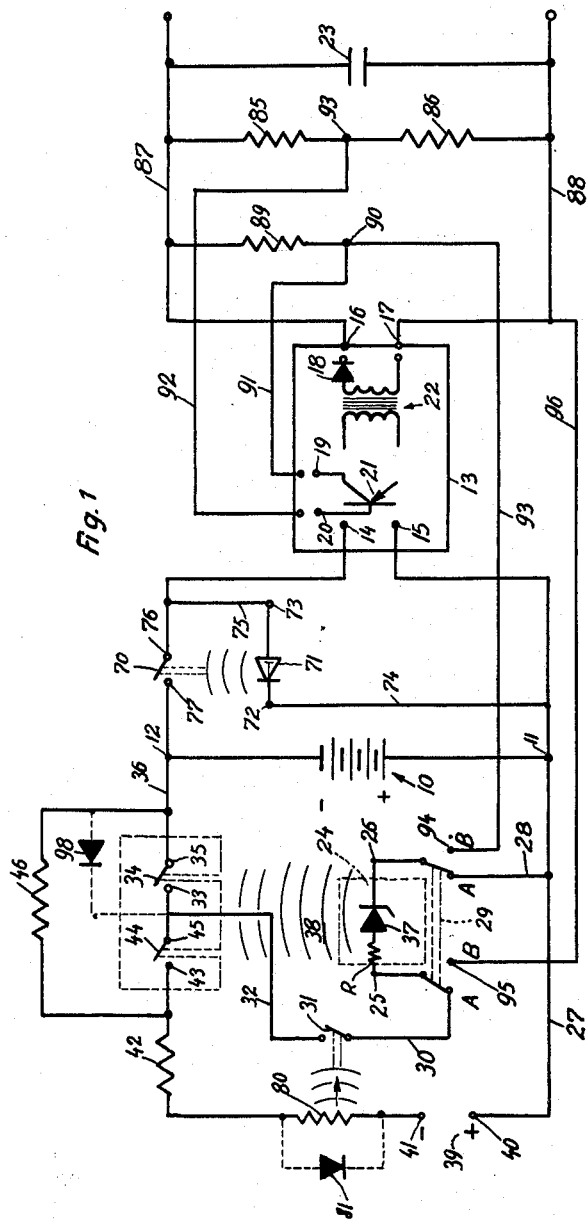

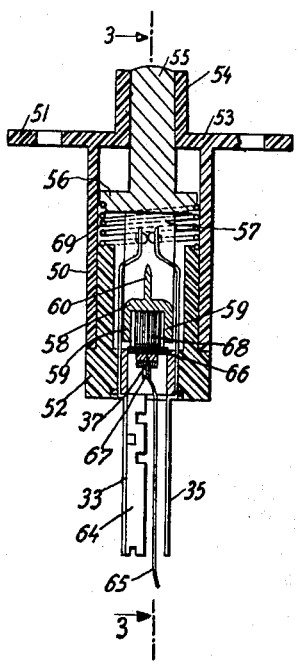
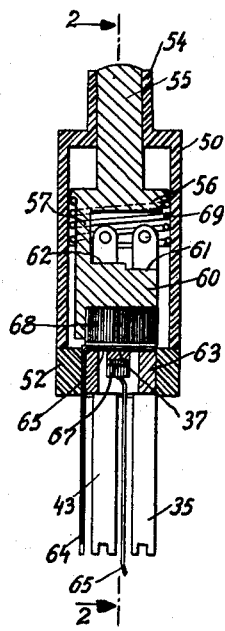
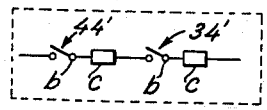
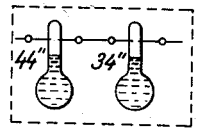

United States Patent Office 3,113,255
Patented Dec. 3, 1963

3,113,255
CONTROL SYSTEM RESPONSIVE TO VOLTAGE, PARTICULARLY FOR CONTROLLING THE CHARGING OR DISCHARGING OPERATION OF AN ACCUMULATOR BATTERY
Klaus Eberts, Budingen, Upper Hesse, Germany, assignor to Accumulatorenfabrik Sonnenschein G.m.b.H., Budingen, Upper Hesse, Germany, a limited-liability company
Filed Dec. 23, 1960, Ser. No. 78,138
Claims priority, application Germany Dec. 23, 1959
23 Claims. (Cl. 320—36)

My invention relates to a control system responsive to voltage, particularly for controlling the charging or discharging operation of an accumulator battery.

It is an object of my invention to provide an improved control system responsive to voltage which is reliable in operation and includes simple elements requiring a minimum of space. More specifically, it is an object of my invention to provide an improved control system for controlling the charging and/or discharging operation of an accumulator battery in such a manner that the re-charging operation pursuant to a discharge of the battery will cease automatically when the voltage of the battery has reached its normal value and/or that the discharging operation of the accumulator battery will cease automatically, when the voltage of the battery reaches a permissible minimum limit, thus preventing an undesirable excessive development of gas bubbles caused by an excessive charging operation and/or preventing a harmful excessive discharge of the battery.

Further objects of my invention will appear from a detailed description of a number of embodiments thereof following hereinafter with reference to the accompanying drawings and the features of novelty will be pointed out in the appended claims. It is to be understood, however, that my invention is in no way restricted or limited to the details of the embodiments described hereinafter but is capable of numerous modifications within the scope of the appended claims and that the terms and phrases used in the detailed description following hereinafter have been chosen for the purpose of explaining the invention rather than that of restricting or limiting the same.

In the drawings:

FIG. 1 is a circuit diagram of my novel control system applied to an accumulator battery which serves to charge a capacitor forming part of a flashlight circuit and circuit means for re-charging the battery, FIG. 2 a second view of an electrical heating element, heat-responsive means and a switch actuated thereby, the section being taken along line 2—2 of FIG. 3, FIG. 3 is a sectional view of the mechanism shown in FIG. 2, the section being taken along the line 3—3 of FIG. 2, FIG. 4 illustrates a modification of the heat-responsive switches shown in FIG. 1, and FIG. 5 shows another modification of the heat-responsive switches.

An electrical accumulating device which, in the instant case, is formed by an electrical accumulator battery 10 having a positive terminal 11 and a negative terminal 12 serves the purpose of supplying electrical energy to the D.C. input of a voltage converter which is diagrammatically indicated by the box 13 and has low voltage input terminals 14 and 15 and high voltage output terminals 16 and 17 and includes means for deriving an A.C. voltage from the direct current flowing between the input terminals 14 and 15, means 22 for transforming such A.C. voltage into a high voltage, means including a rectifier 18 for converting the high A.C. voltage into a high D.C. voltage supplied to the output terminals 16, 17, a control circuit connected to terminals 19 and 20 and a gate which is responsive to a current flowing in such control circuit and, in the embodiment shown, is formed by a transistor 21 and blocks the input of the apparatus 13 when voltage of a predetermined polarity and exceeding a certain limit is supplied to the terminals 19 and 20.

The apparatus 13 serves to charge a capacitor 23 whenever the same has been discharged and means to be described later are provided to limit the maximum voltage of such charge. The voltage converter 13 and the capacitor 23 form part of a conventional photographic flashlight lamp.

The battery 10 may be of a portable type which is normally sealed and, therefore, requires such a control of its re-charging operation as to prevent an excessive quantity of gas bubbles and consequent excessive internal pressure from forming within the battery. Moreover, it is desirable to prevent the battery from being excessively discharged to an abnormally low voltage, since such excessive discharge is harmful and reduces the lifetime of the battery.

For the purpose of attaining these objects I have provided the novel control system described hereinafter.

A conductive element diagrammatically indicated by the box 24 shown in dotted lines and having terminals 25 and 26 is connected in shunt across the source of current represented by battery 10. For that purpose terminal 11 is connected by wires 27 and 28 and one pair of contacts of a double-pole switch 29 to the terminal 26 of the conductive unit 24, whereas the other terminal 25 of the latter is connected to the battery terminal 12 by another pair of contacts of switch 29, a wire 30, a switch 31, a wire 32, a terminal 33 of a switch 34, the other terminal 35 of said switch and wire 36.

As will be explained hereinafter, the switches 31 and 34 are closed whenever the voltage of the battery 10, which represents a source of current having a variable voltage, has a magnitude between an upper limit and a lower limit.

The conductive unit 24 includes a conductive element indicated at 37 which has a non-linear voltage-resistance characteristic rendering the resistance of the element 37 comparatively high, when the voltage applied to the terminals 25 and 26 of the unit 24 is below a certain limit and dropping abruptly, when such voltage rises above such limit.

In the embodiment shown in FIG. 1 the conductive element 37 is formed by a Zener-diode which permits passage of a low current only as long as the battery 10 is partly discharged. When the voltage of the battery during the re-charging operation, however, reaches its permissible maximum magnitude accompanied by the commencement of the development of gas bubbles in the battery, the resistance of the Zener-diode 37 drops abruptly and permits a high current to pass therethrough. The electrical energy of that current will be converted by the diode 37 into heat, and a heat-responsive element illustrated in FIGS. 2 and 3 is mounted in heat-exchange relationship to the Zener-diode in response to a rise of the temperature of the latter above a predetermined level and opens the switch 34, thereby interrupting the charging circuit of the battery. The heat flowing from the Zener-diode 37 to said heat-responsive element is diagrammatically indicated in FIG. 1 at 38. The Zener-diode 37, the heat-responsive element and the switch 34 actuated thereby are included in an assembly which has been illustrated in FIGS. 2 and 3 and will be described later.

The charging circuit for re-charging the battery 10 pursuant to a discharge thereof comprises a source 39 of charging current having a positive terminal 40 connected to wire 27 and a negative terminal 41 connected via a resistor 42 to one terminal 43 of a switch 44 whose other terminal 45 is connected to the wire 32. Therefore, the charging circuit through the battery 10 will be closed and will cause charging current to pass through the battery 10 from the positive terminal 11 to the negative terminal 12 thereof, when both of the switches 34 and 44 are closed.

If desired, a resistor 46 of high resistance may be connected in shunt across the terminals 43 and 35 to permit passage of a charging current through the battery 10, when the battery is fully charged and has its maximum voltage which has caused the unit 24 to open the switches 34, 44 which will then stay in open condition until they are closed manually, as described hereinbelow. The low charging current passing through the resistor 46 will suffice to keep the battery 10 in fully charged condition and to prevent a discharge thereof during storage but does not suffice to produce an excessive gas pressure within the battery.

The assembly illustrated in FIGS. 2 and 3 which includes the Zener-diode 37, the heat-responsive element co-ordinated thereto and the switches 34 and 44 actuated by such element has a substantially cylindrical housing 50 of a suitable plastic provided with a flange 51 for mounting purposes and with a bushing 52 likewise consisting of a plastic and being inserted in the cylindrical housing 50 and suitably fixed therein by means not shown. The end wall 53 of the housing 50 has a tubular extension 54 in which a cylindrical press button 55 is guided which at its lower end is integrally connected with a disk 56 having a depending bar 57 formed integral with the plate 56 and with a channel member having a horizontal web portion 58 formed with depending arms 59 and with a central upright switching blade 60 whose upper edge has an outer horizontal lower section 61 and an inner horizontal higher section 62. The bushing 52 has a recess accommodating the bar 57 and the members integral therewith and has a central aperture accommodating an annulus 63 suitably fixed in the aperture and provided with peripheral axially extending recesses each recess accommodating a metal strip, such as 64, which has a horizontally extending upper section 65 diagrammatically extending across the upper end face of the annulus 63 and having a central aperture in which a disk-shaped body 66 is fixed. This body consists of a conductive ferro-magnetic material of the type having a permeability which varies in dependence on the temperature of the body. When this temperature exceeds the Curie point, the permeability drops to zero or substantially zero. The Zener-diode 37 is formed by a prismatic body having parallel upper and lower surfaces, the upper surface being conductively connected, for instance soldered, to the lower surface of the ferro-magnetic body 66, whereas its lower surface is conductively connected to a contact plate 67, connected by a wire 65 to the terminal 26 (FIG. 1). The metal strip 64 is conductively connected by a wire to the terminal 25 shown in FIG. 1. A permanent magnet 68 of prismatic shape is firmly inserted between the arms 59 and the web portion 58 so as to overlie the ferro-magnetic body 66.

A helical spring 69 inserted between the plate 56 and the upper end of the bushing 52 tends to lift the button 55 to a position in which its upper end projects out of the tubular portion 54. When the parts assume the position shown in FIGS. 2 and 3, however, the mutual attraction of the permanent magnet 68 and the body 66 of ferro-magnetic material holds the button 55 in its lower depressed position shown. When the body 66 constituting the heat-responsive element is heated to a temperature above its Curie point by the current flowing from terminal 26 of the conductive unit 24 through wire 65, the contact plate 67, the Zener-diode 37, the body 66 and the metal strip 64 to the terminal 25, the permeability of the body 66 is reduced so far that the attraction between the body 66 and the permanent magnet 68 will be overcome by the force of the spring 69 which will then move the button 55 upwardly. As the blade 60 forms an integral member with the button 55, it partakes in the upward movement and in so doing separates the contacts 33 and 35 of switch 34 and the contacts 45 and 43 of switch 44. Each of these contacts is formed by a metal strip similar to strip 64 but extending upwardly from the annulus 63, as shown in FIG. 2, having an inwardly offset upper portion carrying a contact member.

As the section 62 of the blade edge is located at a higher lever than the section 61, the contacts 43 and 45 of switch 44 will be separated first before switch 34 comprising the contacts 33 and 35 will be opened. Hence, it will appear that the switches 34 and 44 are so coordinated to and controlled by the heat-responsive element 66 as to be opened thereby successively, the switch 44 being opened first.

The button 55 by projecting out of the tubular portion 54 gives a visible signal of the switch actuation showing that the charging operation has been finished.

When the battery is to be re-charged again, the operator must depress the button 55 to cause switches 34 and 44 to be closed, whereupon the mutual attraction of the magnet 68 and the ferro-magnetic body 66 will hold the button 55 in depressed position, until the re-charging operation causes the voltage of the vattery 10 to reach its upper limit.

If desired, my novel control system may be provided with means which will discontinue the discharging operation of the battery 10 when the voltage thereof has dropped to a permissible lower limit. For this purpose I provide a switch, such as 70, FIG. 1, which, when actuated, prevents further discharge of the battery. Moreover, I provide a conductive element which has a negative non-linear voltage-resistance characteristic and is connected in shunt across the battery 10 to convert electrical energy supplied by the battery into heat, such heat increasing as the voltage of the battery drops owing to a discharge thereof. A heat-responsive element is mounted in heat-exchange relationship to the conductive element and responds to a rise of its temperature above a predetermined level actuating the switch 70.

In the embodiment illustrated in FIG. 1 the conductive element having a negative non-linear voltage-resistance characteristic is formed by a tunnel diode 71 of a type which is well known in the art and, as it does not form part of my invention, need not be described in detail. This tunnel diode has a high resistance as long as subjected to the normal voltage of the battery. When subjected to a reduced voltage representing substantially the permissible lower limit of the voltage of the battery, the resistance drops and permits considerable current to pass through the tunnel diode 71, whereby the same will be heated and will open the switch 70. For this purpose, one terminal 72 of the tunnel diode is connected by a wire 74 to the terminal 11 of the battery, whereas the other terminal 73 of the tunnel diode is connected by a wire 75 to one terminal 76 of the switch 70 whose other terminal 77 is connected to the terminal 12 of the battery 10. The tunnel diode 71 is mounted in heat-exchange relationship to a body of ferro-magnetic material and the latter by cooperation with a permanent magnet controls the switch by way of a mechanism which may be identical with that illustrated in FIGS. 2 and 3 and has a press button which must be depressed by the operator when the battery has been charged to thereby cause switch 70 to be closed. The permanent magnet included in the mechanism will keep the parts in the position in which switch 70 is closed until the discharge of the battery will have reached the point where the ferro-magnetic body is heated above its Curie point by the tunnel diode 71 and, as a result, causes the switch 70 to be opened and to interrupt further discharge of the battery.

Some types of accumulator battery or other accumulator device when fully discharged develop a high resistance which, when the charging operation commences, may raise the voltage across the terminals 11 and 12 of the battery to such a high level as to trip the conductive unit 24 causing the switches 34 and 44 to be opened prematurely.

As this is highly undesirable, I have included in the charging circuit control means responsive to the charging current flowing therethrough. Moreover, I have provided disabling means for disabling the unit 24 so as to render this unit unable to convert electrical energy into heat, such disabling means being so coordinated to the control means as to disable the unit 24, when the charging current flowing through the resistor 42 exceeds a minimum limit. In the embodiment illustrated in FIG. 1 such disabling means is constituted by the switch 31 connecting wires 30 and 32. The control means inserted in the charging circuit is a resistor 80 mounted in heat-exchange relationship with temperature-responsive means which will close the switch 31, when the charging current flowing through the resistor 80 exceeds a certain limit. The heat-responsive means for actuating the switch 31 may be assembled therewith to constitute a mechanism identical with that described hereinabove with reference to FIGS. 2 and 3. Therefore, a detailed description of such means may be dispensed with. It will suffice to state that the mechanism includes an auxiliary heat-responsive means coordinated to the heat-producing resistor 80 to be actuated by the heat produced thereby, when the charging current exceeds a predetermined minimum limit and coordinated to the switch 31 to close same, when actuated, and to open same, when non-actuated.

The resistor 80 may be formed by a rectifier as diagrammatically indicated at 81. In this event, the source 39 supplying a direct charging current may be replaced by a source supplying an alternating charging current which will be rectified by the rectifier 81. Prior to the battery-charging operation the operator must depress the button coordinated to the auxiliary heat-responsive means to thereby open switch 31. Should this switch be closed initially in the charging operation, as indicated by the projection of the press button, the operator must depress the button and after the battery will have been slightly charged to a degree sufficient to reduce the internal resistance of the battery 10 to normal the button will automatically come out again. It is to be understood that this contact arrangement works vice versa to that indicated at FIGS. 2 and 3. For example the blade is not connected with the embodiment 58 but with the disk 56.

As a Zener-diode represents a very useful element, it is desirable to use it for plural functions. In the embodiment illustrated in FIG. 1, the Zener-diode 37 may be also used to control the charging of the capacitor 23 and, for that purpose, may be included in a Wheatstone bridge for effecting such control. This Wheatstone bridge comprises a pair of resistors 85 and 86 connected in series between leads 87 and 88 which connect the capacitor 23 to the output terminals 16 and 17 of the voltage converter 13. A third resistor 89 is connected between the lead 87 and a terminal 90 connected by wire 91 to the terminal 19. The terminal 20 is connected by a wire 92 to a terminal 93 connecting the resistors 85 and 86. A wire 93 connects terminal 90 with a contact 94 of the double-pole switch 29, whereas a contact 95 of this switch is connected by a wire 96 to the lead 88.

When the operator has charged the battery, he will shift the double-pole switch 29 from its A-position to its B-position, thereby connecting the Zener-diode 37 between terminal 90 and lead 88. Hence, it will appear that the gate 21 is included in the diagonal circuit of the Wheatstone bridge connecting terminals 90 and 93.

The operation is as follows: As long as the voltage of the capacitor 23 during its charging operation remains below a certain limit, the voltage applied to the terminals 25 and 26 of the Zener-diode 37 connected in series with the resistor 89 between the output terminals 16 and 17 will remain comparatively low causing the Zener-diode 37 to have a high resistance. As soon as this resistance drops abruptly owing to an increase of voltage, however, the flow of current in the diagonal branch between the terminals 90 and 93 will be reversed and, as a result, the gate 21 will be closed to thereby discontinue the further charging operation.

Hence, it will appear, that the flashlight lamp represents an electrical apparatus including a control circuit in form of the Wheatstone bridge and a gate 21 responsive to a current flowing in said control circuit. The double-pole switch 29 constitutes means which are selectively shiftable to one or the other of two positions A and B, such switch being so coordinated to the Wheatstone bridge and to the conductive element 37 as to be operative in its A-position to include the conductive element 37 in the conductive unit 24 and, when in its B-position, to include the conductive element 37 in the Wheatstone bridge.

The embodiment of my invention described hereinabove with reference to FIGS. 1, 2 and 3 is capable of numerous modifications. Thus, the heat-responsive element 66 may form a signaling member of the type displaying different colors at different temperatures. This can be done by painting it with a temperature-responsive paint. As such paints are well known in the art, a detailed description thereof may be dispensed with. The body 66 so painted must be exposed to view by the use of a transparent plastic for the elements 50, 52 and 59. With this modification, the permanent magnet 68 may be omitted and the button 55 may be provided with a handle for manual operation of the switches 34 and 44 in response to the indication signaled by the member 66.

Moreover, the body 66 of a ferro-magnetic material may be replaced by a body of a ferro-electrical material of the type having dielectric properties variable in dependence on its temperature. In this event, the heat-responsive element will control actuating means in dependence on its dielectric properties for actuation of the switches 34 and 44.

The Zener-diode 37 may be replaced by any other semi-conductor having a non-linear voltage-resistance characteristic causing the current to increase abruptly, when the voltage applied to the terminals 25 and 26 increases above the full battery voltage.

Similarly, the conductive element 37 may be replaced by any suitable diode, such as a glow discharge tube connected in series with a resistor. As soon as the voltage applied to the terminals 25 and 26 of such conductive unit exceeds the full battery voltage, the glow discharge tube will be ignited and permit current to flow through the resistor thereby heating same. This resistor is substituted for the Zener-diode 37 in FIGS. 2 and 3.

Alternatively, the conductive unit 24 may include a resistor such as diagrammatically shown in FIG. 1 at R. Element 37 may be an active dipole connected in series therewith, such as an electro-chemical cell producing a voltage which will counteract the voltage of the battery 10 and thus prevent current from flowing through the resistor until the battery voltage exceeds its normal value. When that happens, the active dipole will no longer block the passage of current but will permit current to flow through the resistor which may be formed by the ferro-magnetic body 66 in FIGS. 1 and 2.

Moreover, a flexible bimetal member may be substituted for the body 66 in FIGS. 2 and 3 and may be so mounted as to raise the button 55 and the blade 60 integral therewith, when heated by the conductive unit 24.

Numerous other heat-responsive elements capable of actuating the button 55 in FIGS. 2 and 3 are known in the art and may be substituted for the ferro-magnetic body 66 and the permanent magnet 68. Thus, for instance, heat-responsive elements including a heat-expansible medium may be used.

The switches 34 and 44 constitute electrical gates which are so coordinated to and controlled by the heat-responsive element as to block the charging circuit, when the heat-responsive element responds to a rise of its temperature. Clearly, electrical gates other than switches proper may be used for the same purpose.

The flashlight lamp including the capacitor 23 may be replaced by any current consumer connectable to the terminals 11 and 12 of the battery.

The source of charging current 39 may have an internal resistance which is higher than that of the accumulating battery 10 to thereby reduce the variation of the charging current during the charging operation. Alternatively, it is possible, however, to use a source of charging current 39 which has an internal resistance lower than that of the accumulator battery 10 to thereby render the charging current variable between wide limits during the charging operation.

The current flowing through a tunnel diode when increasing from zero at a voltage of zero will reach a maximum at a voltage of 4 v. and, upon further increase of the voltage will drop and will nearly reach zero again, when the voltage reaches 6 v. Only when the voltage further increases will the current gradually increase but this occurs in a range of voltages outside of the values that may occur in the system illustrated in FIG. 1.

While my novel control system has been described hereinabove as applied to an electrical battery, it is capable of numerous other purposes where a switch or the like must be actuated or a signal must be emitted in response to the passage of a variable voltage through a predetermined upper or lower limit.

A rectifier 98, FIG. 1, may be connected between the wires 32 and 36. In this event, the switch 34 may be omitted, since the rectifier prevents a discharge of the battery through the conductive unit 24 upon termination of the loading operation, after switch 44 has been opened.

The switches 34 and 44 controlled by the heat-responsive element 66 so as to be opened thereby successively may be replaced by the heat-responsive switches 34' and 44' shown in FIG. 4. Each of these switches compises a flexible bimetal member $b$ mounted in a support $c$. At normal temperature each of the bimetal members $b$ have such a shape as to close the contact. When the temperature of the bimetal member $b$ is raised by the heat 38, however, it will bend upwardly so as to interrupt the contact.

In FIG. 5 I have illustrated heat responsive switches 44" and 34" which can be substituted for the switches 44 and 34 in FIG. 1. Each of these switches comprises a thermometer tube having a bulb filled with mercury. Each tube is provided with a pair of opposite contacts extending through the walls thereof. When the mercury rises under the effect of heat expansion caused by the heat 38 it will establish a conductive bridge between the opposite contacts thereby closing the switch.

From the foregoing it will be seen that this invention is one well adapted to attain all of the ends and objects hereinabove set forth, together with other advantages which are obvious and which are inherent to the system.

While the invention has been described in connection with a number of preferred embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

What I claim is:

1. In a control system, the combination comprising a source of current having a variable voltage, a conductive unit including a conductive element having a non-linear voltage-resistance characteristic, said unit being connected in shunt across said source to convert electrical energy supplied by said source into heat, and a heat-responsive element which is mounted in heat-exchange relationship to said unit and responds to a rise of its temperature above a predetermined degree, said characteristic being so chosen that said unit will not heat said heat-responsive element to a temperature above said degree unless said variable voltage passes through a predetermined limit, said characteristic showing an abrupt change of resistance upon passage of the voltage through said limit.

2. The combination claimed in claim 1 in which said conductive element is of the type having a negative non-linear voltage-resistance characteristic.

3. The combination claimed in claim 1 in which said conductive element is a semi-conductor.

4. The combination claimed in claim 1 in which said conductive element is a Zener-diode.

5. The combination claimed in claim 1 in which said conductive element is a diode.

6. The combination claimed in claim 1 in which said heat-responsive element is a heat-responsive switch.

7. The combination claimed in claim 1 in which said heat-responsive element is a heat-responsive signaling member.

8. The combination claimed in claim 1 in which said heat-responsive element is a flexible bimetal member.

9. The combination claimed in claim 1 in which said heat-responsive element includes a heat-expansible medium.

10. The combination claimed in claim 1 in which said source of current having a variable voltage is an accumulating device adapted to be charged after having been discharged, said combination further including a charging circuit coordinated to said device and including an electrical gate, the latter being coordinated to and controlled by said heat-responsive element so as to block said circuit, when said heat-responsive element responds to a rise of its temperature, said predetermined limit representing the voltage of said device in fully charged condition.

11. The combination claimed in claim 1 in which said conductive element is of the type having a negative non-linear voltage-resistance characteristic and said source of current is an accumulator battery, said combination further comprising an electrical switch coordinated to said battery for preventing discharge thereof when actuated, said switch being so coordinated to and controlled by said heat-responsive element as to be actuated thereby, when said element responds to a rise of its temperature, said predetermined limit representing the voltage of the battery in discharged condition.

12. In a battery charging system, the combination comprising an accumulator batterey adapted to be charged after having been discharged, a source of charging current, a conductive unit including a conductive element having a non-linear voltage-resistance characteristic, a first switch for connecting said unit in shunt across said battery, a second switch for connecting said unit in shunt across said source to convert electrical energy supplied by said source into heat, means for connecting said battery in a charging circuit with said source, said circuit including at least said second switch and a heat-responsive element which is mounted in heat-exchange relationship to said unit and responds to a rise of its temperature above a predetermined level, said characteristic being so chosen that said unit will only heat said heat-responsive element to a temperature above said level if the voltage of said source and of said battery passes above a normal limit, both of said switches being so coordinated to and controlled by said heat-responsive element as to be opened thereby, when said element responds to a rise of its temperature.

13. The combination claimed in claim 12 in which both of said switches are so coordinated to and controlled by said heat-responsive element as to be opened thereby successively, said second switch being opened first.

14. The combination claimed in claim 12 further comprising a resistor connected in shunt across said first switch so as to permit passage of a limited loading current through said charging circuit, when said first switch is open.

15. The combination claimed in claim 1 further comprising a resistor connected in series with said conductive element and forming part of said conductive unit.

16. In a control system, the combination comprising an accumulator battery, a conductive element having a negative non-linear voltage-resistance characteristic and being connected in shunt across said battery to convert electrical energy supplied by said battery into heat, said heat increasing as the voltage of said battery drops owing to a discharge thereof, a heat-responsive element which is mounted in heat-exchange relationship to said conductive element and responds to a rise of its temperature above a predetermined level, said characteristic being so chosen that said conductive element will not heat said heat-responsive element to a temperature above said level unless said voltage drops below a predetermined limit, and an electrical switch coordinated to said battery for preventing discharge thereof when actuated, said switch being so coordinated to and controlled by said heat-responsive element as to be actuated by the response thereof.

17. The combination claimed in claim 16 further comprising a source of loading current, said electrical switch being so coordinated to said source as to connect the same in a loading circuit with said battery when said switch is actuated.

18. The combination claimed in claim 16 further comprising a current consumer, said switch, when non-actuated, establishing a circuit through said consumer and said battery permitting discharge thereof and, when actuated, interrupting said circuit thereby preventing discharge of said battery.

19. The combination claimed in claim 18 in which said heat-responsive element includes a body of a ferro-magnetic material of the type having a permeability variable in dependence on its temperature.

20. The combination claimed in claim 18 in which said conductive element constitutes a tunnel diode.

21. The combination claimed in claim 10 in which said source of charging current included in said charging circuit has an internal resistance higher than that of said accumulating device to thereby reduce variation of said charging current during the charging operation.

22. The combination claimed in claim 10 in which said source of charging current being included in said charging circuit has an internal resistance lower than that of said accumulating device to thereby render said charging current variable between wide limits during the charging operation.

23. The combination claimed in claim 1 further comprising an electrical apparatus including a control circuit and a gate responsive to a current flowing in said control circuit, and means selectively shiftable to one or the other of two positions, said means being so coordinated to said control circuit and to said conductive element having a non-linear voltage-resistance characteristic as to be operative, when in one position, to include said conductive element in said conductive unit and, when in its other position, to include said conductive element in said control circuit.

No references cited.